United States Patent
Cho et al.

(10) Patent No.: US 12,216,753 B2
(45) Date of Patent: Feb. 4, 2025

(54) PROVISIONING MULTIPLE PLATFORM ROOT OF TRUST ENTITIES OF A HARDWARE DEVICE USING ROLE-BASED IDENTITY CERTIFICATES

(71) Applicant: Dell Products L.P., Round Rock, TX (US)

(72) Inventors: Eugene David Cho, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 181 days.

(21) Appl. No.: 17/973,803

(22) Filed: Oct. 26, 2022

(65) Prior Publication Data

US 2024/0143718 A1    May 2, 2024

(51) Int. Cl.
G06F 21/33    (2013.01)
G06F 21/57    (2013.01)

(52) U.S. Cl.
CPC .............. *G06F 21/33* (2013.01); *G06F 21/57* (2013.01); *G06F 2221/034* (2013.01)

(58) Field of Classification Search
CPC ..... G06F 21/33; G06F 21/57; G06F 2221/034
See application file for complete search history.

(56) References Cited

U.S. PATENT DOCUMENTS

| | | | | |
|---|---|---|---|---|
| 5,659,616 A * | 8/1997 | Sudia | ................ | G06Q 20/3821 380/30 |
| 2002/0073308 A1 * | 6/2002 | Benantar | ............... | H04L 9/3263 713/155 |
| 2002/0138738 A1 * | 9/2002 | Sames | ..................... | H04L 63/14 713/185 |
| 2003/0163685 A1 * | 8/2003 | Paatero | ................. | H04W 12/06 713/155 |
| 2005/0144144 A1 * | 6/2005 | Graff | ....................... | G06F 21/33 705/76 |
| 2005/0223221 A1 * | 10/2005 | Proudler | ................. | G06F 21/62 713/194 |

(Continued)

OTHER PUBLICATIONS

"Protect, Detect and Recover with Platform Firmware Resiliency"; https://www.microchip.com/en-us/solutions/data-centers-and-computing/computing-solutions/technologies/platform-root-of-trust-secure-boot; downloaded on Oct. 18, 2022.

(Continued)

*Primary Examiner* — Vance M Little
(74) *Attorney, Agent, or Firm* — Ryan, Mason & Lewis, LLP

(57) ABSTRACT

Techniques are provided for provisioning multiple platform root of trust (PRoT) entities using role-based identity certificates. One method comprises obtaining a designation of a PRoT entity of a hardware device as a PRoT leader associated with a leader role; recording the leader role as a role attribute in an identity certificate; and providing the identity certificate to the hardware device during a provisioning of the hardware device, wherein the given PRoT entity assumes the leader role of the hardware device and initiates security actions of the PRoT leader upon an initiation of the hardware device. Leader responsibilities can be assigned to the PRoT leader and the one or more leader responsibilities of the PRoT leader may be recorded as a leader responsibility attribute in the identity certificate.

20 Claims, 15 Drawing Sheets

(56) References Cited

U.S. PATENT DOCUMENTS

| | | | |
|---|---|---|---|
| 2006/0156391 A1* | 7/2006 | Salowey | H04L 63/20 |
| | | | 726/5 |
| 2020/0257518 A1* | 8/2020 | Liedtke | G06F 8/65 |
| 2021/0243173 A1* | 8/2021 | D'Alessandro | H04L 63/0464 |
| 2021/0288822 A1* | 9/2021 | Sorensen | H04L 9/321 |
| 2021/0314365 A1* | 10/2021 | Smith | G06F 11/301 |
| 2022/0393884 A1* | 12/2022 | Panchamia | H04L 9/083 |
| 2023/0020838 A1* | 1/2023 | Volos | G06F 21/575 |

OTHER PUBLICATIONS

Al-Galby, Mohamad, et al.; "Hardware Root of Trust for Linux Based Edge Gateway"; Independent Project (Degree Project), 15 credits, for the Degree of Master of Science in Computer Science with Specialization in Embedded Systems Spring Semester 2018; downloaded on Oct. 18, 2022.

Brink, Derek; "Endpoint Security: Hardware Roots of Trust"; Aberdeen Group, Jun. 2012.

* cited by examiner

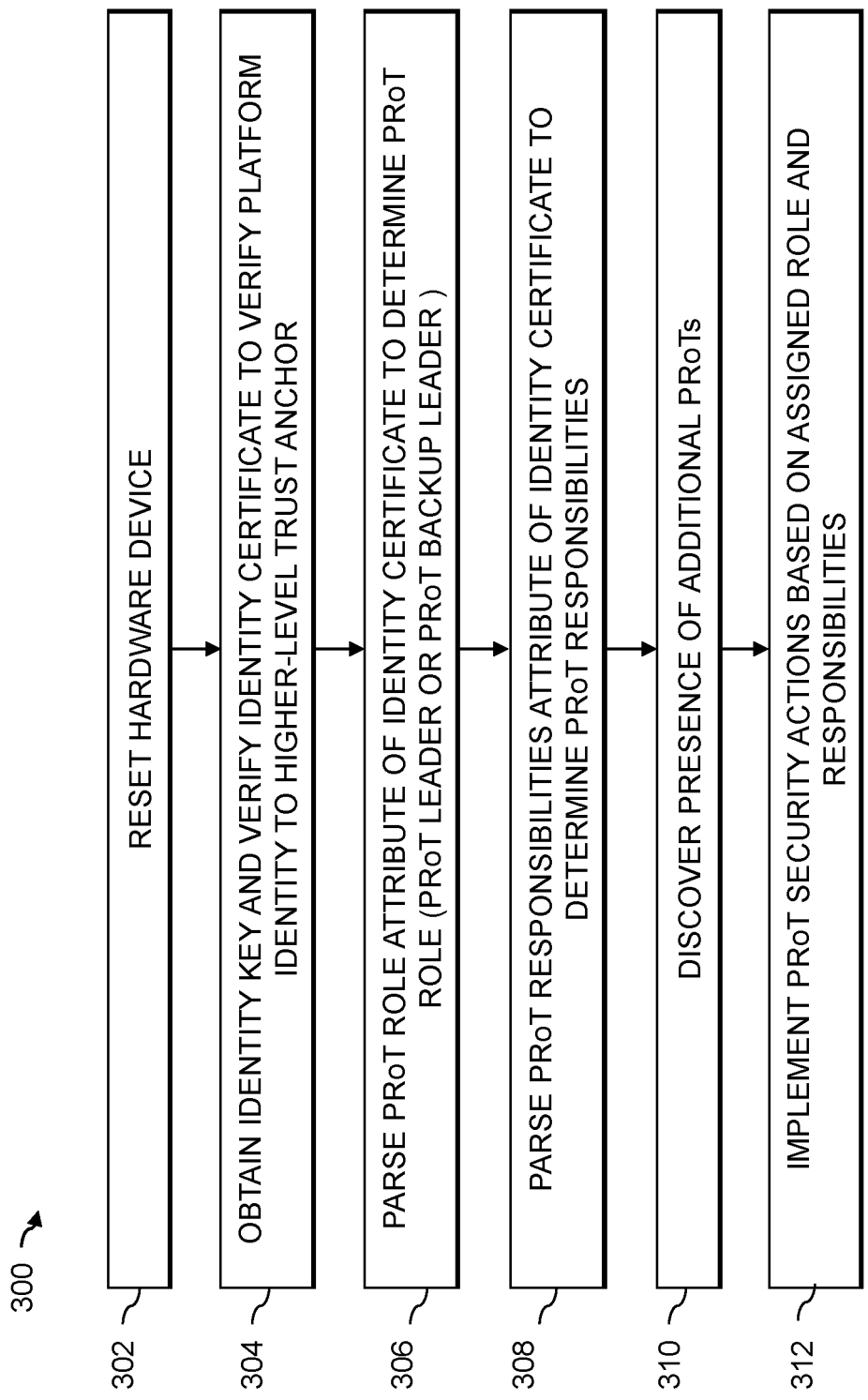

DEVICE BEHAVIOR FOR PRoT BACKUP LEADER(S) WITH FULL LEADERSHIP ABILITIES

| PRoT LEADER STATUS | PRoT BACKUP LEADER STATUS | PROVISIONED DEVICE BEHAVIOR |
|---|---|---|
| ONLINE | ONLINE | NORMAL, FULL OPERATIONAL SECURITY STATE |
| ONLINE | REMOVED OR UNAVAILABLE | FULL OPERATIONAL SECURITY STATE, LOSS OF REDUNDANCY |
| REMOVED OR UNAVAILABLE | ONLINE | NORMAL, FULL OPERATIONAL SECURITY STATE |
| REMOVED OR UNAVAILABLE | REMOVED OR UNAVAILABLE | NON-OPERATIONAL |

DEVICE BEHAVIOR FOR PRoT BACKUP LEADER(S) WITH
LIMITED LEADERSHIP ABILITIES

| PRoT LEADER STATUS | PRoT BACKUP LEADER STATUS | PROVISIONED DEVICE BEHAVIOR |
|---|---|---|
| ONLINE | ONLINE | NORMAL, FULL OPERATIONAL SECURITY STATE |
| ONLINE | REMOVED OR UNAVAILABLE | FULL OPERATIONAL SECURITY STATE, LOSS OF REDUNDANCY |
| REMOVED OR UNAVAILABLE | ONLINE | DEGRADED SECURITY STATE, BUT FUNCTIONAL (E.G., SAFE MODE) |
| REMOVED OR UNAVAILABLE | REMOVED OR UNAVAILABLE | NON-OPERATIONAL |

ROLES AND RESPONSIBILITIES - PRoT LEADER AND PRoT BACKUP LEADER WITH FULL LEADERSHIP ABILITIES

| PRoT ROLE | RESPOND TO EMBEDDED HARDWARE VALIDATOR UTILITY | RESPOND TO REMOTE ATTESTATION OF DEVICE IDENTITY | VERIFICATION/ATTESTATION OF BIOS (PRIOR TO POWER ON) |
|---|---|---|---|
| PRoT LEADER | YES | YES | YES |
| PRoT BACKUP LEADER 1 | ONLY WHEN LEADER UNAVAILABLE | ONLY WHEN LEADER UNAVAILABLE | ONLY WHEN LEADER UNAVAILABLE |
| PRoT BACKUP LEADER 2 | ONLY WHEN LEADER AND BACKUP LEADER 1 UNAVAILABLE | ONLY WHEN LEADER AND BACKUP LEADER 1 UNAVAILABLE | ONLY WHEN LEADER AND BACKUP LEADER 1 UNAVAILABLE |
| ... | | | ... |
| PRoT BACKUP LEADER N | ONLY WHEN LEADER AND BACKUP LEADERS 1 THROGH N-1 UNAVAILABLE | ONLY WHEN LEADER AND BACKUP LEADERS 1 THROGH N-1 UNAVAILABLE | ONLY WHEN LEADER AND BACKUP LEADERS 1 THROGH N-1 UNAVAILABLE |

FIG. 5A

ROLES AND RESPONSIBILITIES - PRoT LEADER AND PRoT BACKUP LEADER WITH LIMITED LEADERSHIP ABILITIES

550

| PRoT ROLE | RESPOND TO EMBEDDED HW VALIDATOR UTILITY | RESPOND TO REMOTE ATTESTATION OF DEVICE IDENTITY | VERIFICATION/ATTESTATION OF BIOS (PRIOR TO POWER ON) |
|---|---|---|---|
| PRoT LEADER | YES | YES | YES |
| PRoT BACKUP LEADER 1 | NO | NO | ONLY WHEN LEADER UNAVAILABLE |
| PRoT BACKUP LEADER 2 | NO | NO | ONLY WHEN LEADER AND BACKUP LEADER 1 UNAVAILABLE |
| ... | | | ... |
| PRoT BACKUP LEADER N | NO | NO | ONLY WHEN LEADER AND BACKUP LEADERS 1 THROGH N-1 UNAVAILABLE |

FIG. 5B

PROVISIONING MULTIPLE PLATFORM ROOT OF TRUST ENTITIES OF A HARDWARE DEVICE USING ROLE-BASED IDENTITY CERTIFICATES

FIELD

The field relates generally to information processing systems, and more particularly to the provisioning of such information processing systems.

BACKGROUND

Devices, such as servers and storage appliances, increasingly have multiple components (e.g., multiple systems on a chip) that can serve as the root of trust for the device. In addition, some root of trust candidates, such as pluggable components, may only be temporarily added to the device.

A need exists for techniques for provisioning a device having multiple components that are candidates to be the root of trust for the device.

SUMMARY

In one embodiment, a method comprises obtaining a designation of a platform root of trust entity of a hardware device as a platform root of trust leader associated with a leader role; recording the leader role of the platform root of trust leader as a role attribute in an identity certificate associated with the platform root of trust leader; and providing the identity certificate to the hardware device during a provisioning of the hardware device, wherein the given platform root of trust entity assumes the leader role of the hardware device and initiates one or more security actions of the platform root of trust leader upon an initiation of the hardware device in response to the given platform root of trust entity parsing the leader role attribute of the identity certificate associated with the platform root of trust leader.

In some embodiments, one or more leader responsibilities are assigned to the platform root of trust leader and the one or more leader responsibilities of the platform root of trust leader are recorded as a leader responsibility attribute in the identity certificate associated with the platform root of trust leader, and wherein the platform root of trust leader assumes the one or more leader responsibilities upon the initiation of the hardware device in response to the platform root of trust leader parsing the leader responsibility attribute of the identity certificate associated with the platform root of trust leader.

In one or more embodiments, one or more additional platform root of trust entities are designated as one or more respective platform root of trust backup leaders associated with a backup leader role; one or more backup leader responsibilities are assigned to the one or more platform root of trust backup leaders; and the backup leader role is recorded as a role attribute in an identity certificate associated with the respective backup leader and the one or more backup leader responsibilities of the platform root of trust backup leader are recorded as a backup responsibility attribute in the identity certificate associated with the respective backup leader, wherein the one or more platform root of trust backup leaders assume the backup leader role and the one or more backup leader responsibilities of the hardware device upon the initiation of the hardware device in response to the one or more platform root of trust backup leaders parsing the backup leader role attribute and the backup leader responsibility attribute of the identity certificate associated with the respective backup leader.

In at least some embodiments, the platform root of trust leader cross-signs the i associated with the platform root of trust leader with the identity certificate associated with each of the one or more platform root of trust backup leaders and the platform root of trust leader signs an identity leaf certificate signing request with a cross-signed leader identity key from the cross-signed identity certificate of the platform root of trust leader. The platform root of trust leader may provide the signed identity leaf key to the one or more platform root of trust backup leaders and wherein each of the one or more platform root of trust backup leaders sign the signed identity leaf certificate signing request with a respective cross-signed backup leader identity key from the cross-signed identity certificate of the respective platform root of trust backup leader.

Other illustrative embodiments include, without limitation, apparatus, systems, methods and computer program products comprising processor-readable storage media.

BRIEF DESCRIPTION OF THE DRAWINGS

FIG. 3 is a flow chart illustrating an exemplary implementation of a run-time boot process performed by the various PRoT entities of the hardware device of FIG. 1 in accordance with an illustrative embodiment;

FIGS. 4A and 4B are sample tables identifying device behavior for a hardware device having one or more PRoT backup leaders with full leadership abilities and limited leadership abilities, respectively, in accordance with illustrative embodiments;

FIGS. 5A and 5B are sample tables identifying roles and corresponding responsibilities for PRoT leaders and for one or more PRoT backup leaders with full leadership abilities and limited leadership abilities, respectively, in accordance with illustrative embodiments;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for provisioning multiple PRoT entities using role-based identity certificates.

As noted above, hardware devices increasingly have multiple components that can serve as the root of trust for a given hardware device. In one or more embodiments of the disclosure, one of the candidate root of trust entities is securely designated (e.g., as part of a provisioning of the device) to be a PRoT leader for the device by specifying a configurable leader role as a role attribute in an identity certificate associated with the designated PRoT leader. In addition, one or more additional candidate root of trust entities can be securely designated to be a PRoT backup leader for the device by specifying a configurable backup leader role as a role attribute in the respective identity certificates associated with the one or more PRoT backup leaders.

In some embodiments, the responsibilities assigned to the PRoT leader and the one or more PRoT backup leaders may also be configured using a responsibilities attribute in the respective identity certificate as part of a provisioning of the device. For example, one or more of the PRoT backup leaders may be configured using the responsibilities attribute to provide full or limited leadership abilities in the event that the original PRoT leader becomes unavailable.

The identity certificate attributes may also be employed to specify an expected installation state of any pluggable PRoTs in a given hardware device. In one or more embodiments, cryptographic techniques are employed to detect that the PRoT leader is unavailable (e.g., missing and expected to be installed), for example, to trigger a leadership transition to one of the designated PRoT backup leaders.

In at least one embodiment, the PRoT leader cross-signs the identity certificate of the PRoT leader with the respective identity certificate of each of the one or more PRoT backup leaders. In this manner, the valid trust anchor paths within a given hardware device are increased.

Among other benefits, the disclosed techniques for provisioning multiple PRoT entities using role-based identity certificates promote PRoT redundancy and increased availability of a given hardware device. In addition, the PRoT attributes specified in the identity certificates may be updated using delta certificates in accordance with specifications of the Trusted Computing Group (TCG), for example.

Figure 1:
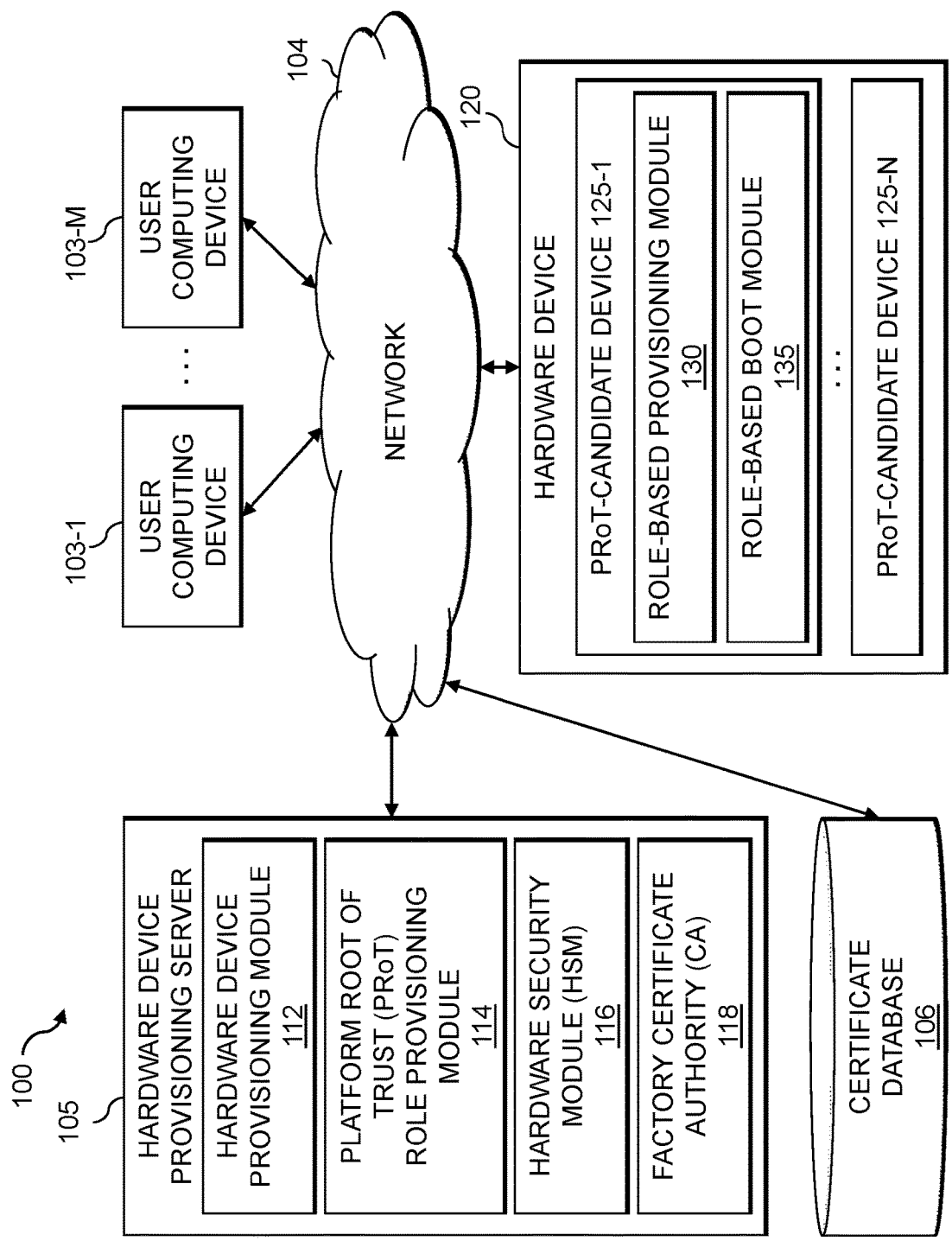
FIG. 1 illustrates an information processing system configured for provisioning multiple platform root of trust (PRoT) entities using role-based identity certificates in accordance with an illustrative embodiment.

FIG. 1 illustrates a computer network (also referred to herein as an information processing system) 100 configured to provision multiple PRoT entities using role-based identity certificates in accordance with an illustrative embodiment. The computer network 100 comprises a plurality of user computing devices 103-1 through 103-M, collectively referred to herein as user computing devices 103. The user computing devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more hardware device provisioning servers 105, one or more certificate databases 106, and one or more hardware devices 120, discussed below.

The user computing devices 103 and/or hardware devices 120 may comprise, for example, host devices, storage appliances and/or devices such as mobile telephones, laptop computers, tablet computers, desktop computers or other types of computing devices. Such devices are examples of what are more generally referred to herein as "processing devices." Some of these processing devices are also generally referred to herein as "computers." The user computing devices 103 and/or hardware devices 120 may comprise a network client that includes networking capabilities such as ethernet, Wi-Fi, etc. When the user computing devices 103 and/or hardware devices 120 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user computing devices 103 and/or hardware devices 120 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (STaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

As shown in FIG. 1, an exemplary hardware device provisioning server 105 may comprise a hardware device provisioning module 112, a PRoT role provisioning module 114, a hardware security module (HSM) 116 and a factory certificate authority (CA) 118. In the example of FIG. 1, the hardware device provisioning module 112 provisions one or more hardware devices 120, as discussed further below in conjunction with FIG. 2A. The PRoT role provisioning module 114 is used to provision the PRoT role of multiple PRoT entities in a hardware device being provisioned (e.g., as a PRoT leader or a PRoT backup leader using role attributes in identity certificates). The hardware security module (HSM) 116 and factory certificate authority 118 may be employed to provide a source of trust for a hardware device being provisioned, as discussed further below in conjunction with FIG. 6A, for example.

It is to be appreciated that this particular arrangement of elements 112, 114, 116, 118 illustrated in the hardware device provisioning server 105 of the FIG. 1 embodiment is presented by way of example only, and alternative arrangements can be used in other embodiments. For example, the functionality associated with elements 112, 114, 116, 118 in other embodiments can be combined into a single element, or separated across a larger number of elements. As another example, multiple distinct processors can be used to implement different ones of elements 112, 114, 116, 118 or portions thereof.

At least portions of elements 112, 114, 116, 118 may be implemented at least in part in the form of software that is stored in memory and executed by a processor. An exemplary process utilizing elements 112, 114, 116, 118 of the hardware device provisioning server 105 in computer network 100 will be described in more detail with reference to FIGS. 2A and 6A, for example.

The hardware device provisioning server 105 may be implemented, for example, in a factory or other fabrication facility of an enterprise or another organization. In some embodiments, the hardware device provisioning server 105, or portions thereof, may be implemented as part of a host device.

As shown in FIG. 1, an exemplary hardware device 120 (e.g., a device being provisioned by the hardware device provisioning server 105) may comprise multiple PRoT-candidate devices 125-1 through 125-N. In the example of FIG. 1, the PRoT-candidate device 125-1 comprises a role-based provisioning module 130 and a role-based boot module 135. The PRoT-candidate device 125-N is assumed to be implemented in a similar manner as the PRoT-candidate device 125-1.

The role-based provisioning module 130 may be configured to provision the PRoT-candidate device 125-1 based on whether the PRoT-candidate device 125-1 assumes the role of a PRoT leader or a PRoT backup leader, as discussed further below in conjunction with FIGS. 2B and 2C, for example. The role-based boot module 135 may be configured to boot the PRoT-candidate device 125-1 to determine whether the PRoT-candidate device 125-1 has been designated as a PRoT leader or a PRoT backup leader, as discussed further below in conjunction with FIG. 3, for example.

The PRoT-candidate devices 125 may be implemented, for example, as a security processor within a system on a chip, such as a baseboard management controller (BMC), such as the Integrated Dell Remote Access Controller (iDRAC), commercially available from Dell Technologies, or another out-of-band (OOB) controller. In further variations, one or more of the PRoT-candidate devices 125 may be implemented, for example, as a microprocessor, a microcontroller, an application-specific integrated circuit (ASIC), a field-programmable gate array (FPGA), a host processor module, a storage controller or other type of silicon-based processing circuitry that can provide a foundation for device trust and resiliency, as well as portions or combinations of such circuitry elements. Generally, the PRoT-candidate devices 125 comprise a source that can be trusted within a cryptographic system to anchor a boot process while establishing a chain of trust for the entire hardware device 120.

In some embodiments, a trusted platform module (not shown in FIG. 1) may comprise one or more registers (e.g., platform configuration registers), a secure storage and a cryptographic processor that supports various cryptographic capabilities. The trusted platform module may employ such cryptographic capabilities to calculate one or more hash values based on software and/or firmware instructions utilized by certain components of the hardware device 120, such as the basic input/output system and/or a boot loader. Such hash values may be compared to reference hash values previously stored in a secure memory, for example, during a factory provisioning of the hardware device 120. In this manner, the trusted platform module may establish a root of trust to validate that other components of the hardware device 120 as using instructions that originate from a trusted source.

It is to be appreciated that this particular arrangement of modules 130, 135 illustrated in the PRoT-candidate devices 125 of hardware device 120 of the FIG. 1 embodiment is presented by way of example only, and alternative arrangements can be used in other embodiments. For example, the functionality associated with modules 130, 135 in other embodiments can be combined into a single element, or separated across a larger number of elements. As another example, multiple distinct processors can be used to implement different ones of modules 130, 135 or portions thereof.

At least portions of modules 130, 135 may be implemented at least in part in the form of software that is stored in memory and executed by a processor. An exemplary process utilizing modules 130, 135 of the PRoT-candidate devices 125 of hardware device 120 in computer network 100 will be described in more detail with reference to FIGS. 2B, 2C and 3, for example.

Additionally, the user computing devices 103, hardware device provisioning server 105 and/or the hardware device 120 can have an associated certificate database 106 configured to store, for example, information related to hardware and identity certificates, as discussed further below.

At least portions of the certificate database 106 configured to store, for example, certificate information may be implemented, for example, using a vault provided by an operating system of one or more of the user computing devices 103, hardware device provisioning server 105 and/or the hardware device 120.

The certificate database 106 in the present embodiment is implemented using one or more storage systems associated with the hardware device 120. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user computing devices 103, hardware device provisioning server 105 and/or the hardware device 120 may be implemented on a common processing platform, or on separate processing platforms. The user computing devices 103 and/or hardware device provisioning servers 105 may be configured to interact over the network 104 in at least some embodiments with the hardware device 120.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more user computing devices 103, hardware device provisioning server 105 and/or the hardware device 120 can be one or more input-output devices (not shown), which illustratively comprise keyboards, displays or other types of input-output devices in any combination. Such input-output devices can be used, for example, to support one or more user interfaces to the user computing devices 103, hardware device provisioning server 105 and/or the hardware device 120, as well as to support communications between the user computing devices 103, hardware device provisioning server 105, hardware device 120 and other related systems and devices not explicitly shown.

The one or more user computing devices 103, hardware device provisioning server 105 and/or the hardware device 120 in the FIG. 1 embodiment are assumed to be implemented using at least one processing device. Each such processing device generally comprises at least one processor and an associated memory, and implements one or more functional modules for controlling certain features of the respective device.

More particularly, the one or more user computing devices 103, hardware device provisioning server 105 and/or the hardware device 120 in this embodiment each can comprise a processor coupled to a memory and a network interface.

The processor illustratively comprises a microprocessor, a microcontroller, an ASIC, an FPGA or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more hardware device provisioning servers 105, user computing devices 103 and/or hardware devices 120 to communicate in some embodiments over the network 104 with each other (as well as one or more other networked devices), and illustratively comprises one or more conventional transceivers.

It is to be understood that the particular set of elements shown in FIG. 1 for provisioning multiple PRoT entities using role-based identity certificates is presented by way of illustrative example only, and in other embodiments additional or alternative elements may be used. Thus, another embodiment includes additional or alternative systems, devices and other network entities, as well as different arrangements of modules and other components.

Figure 2A:
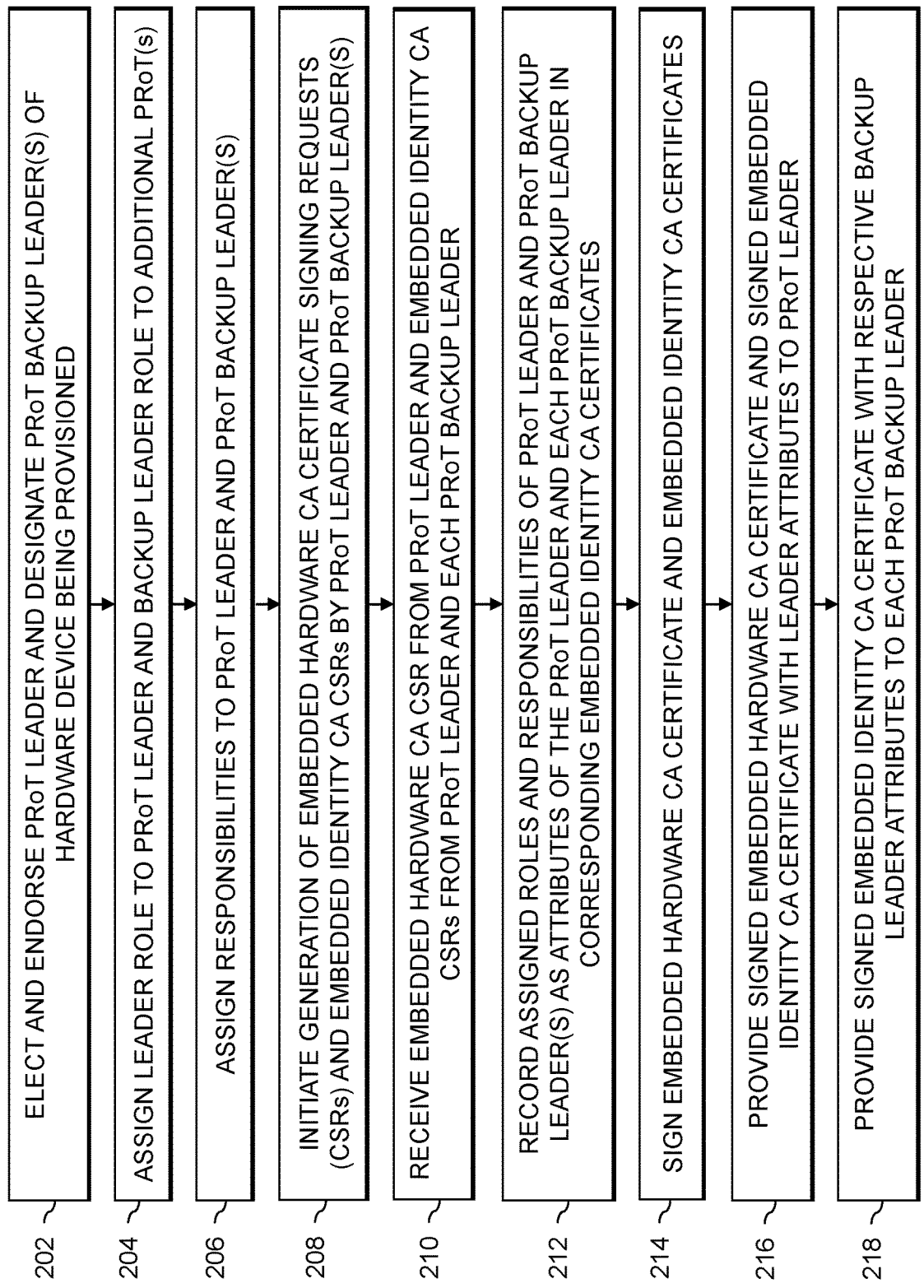
FIGS. 2A, 2B and 2C are flow charts illustrating exemplary implementations of a provisioning process performed by the hardware device provisioning server of FIG. 1, a PRoT leader entity of the hardware device of FIG. 1 and at least one backup PRoT leader entity of the hardware device of FIG. 1, respectively, in accordance with illustrative embodiments.
Figure 2B:
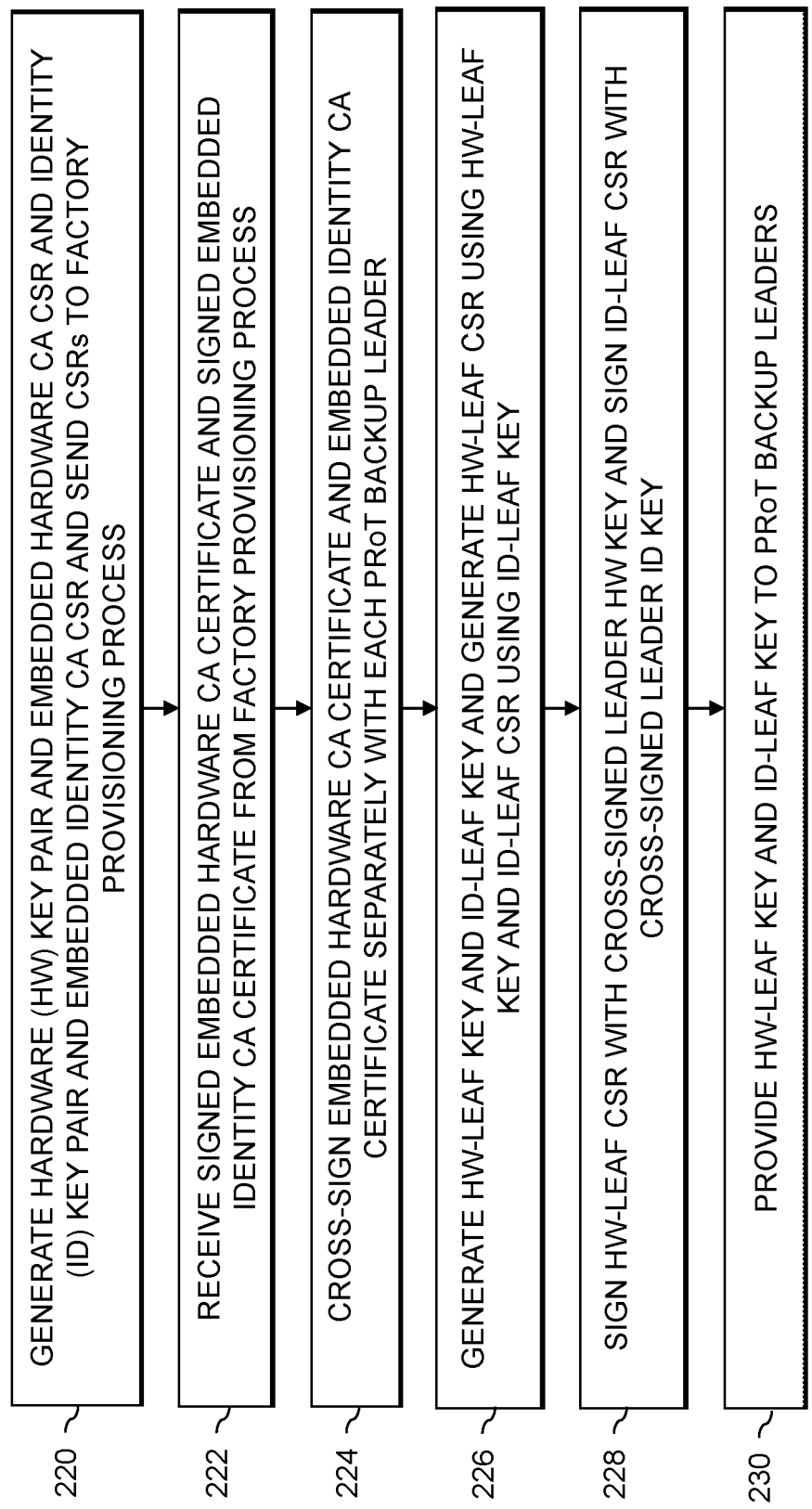
Figure 2C:
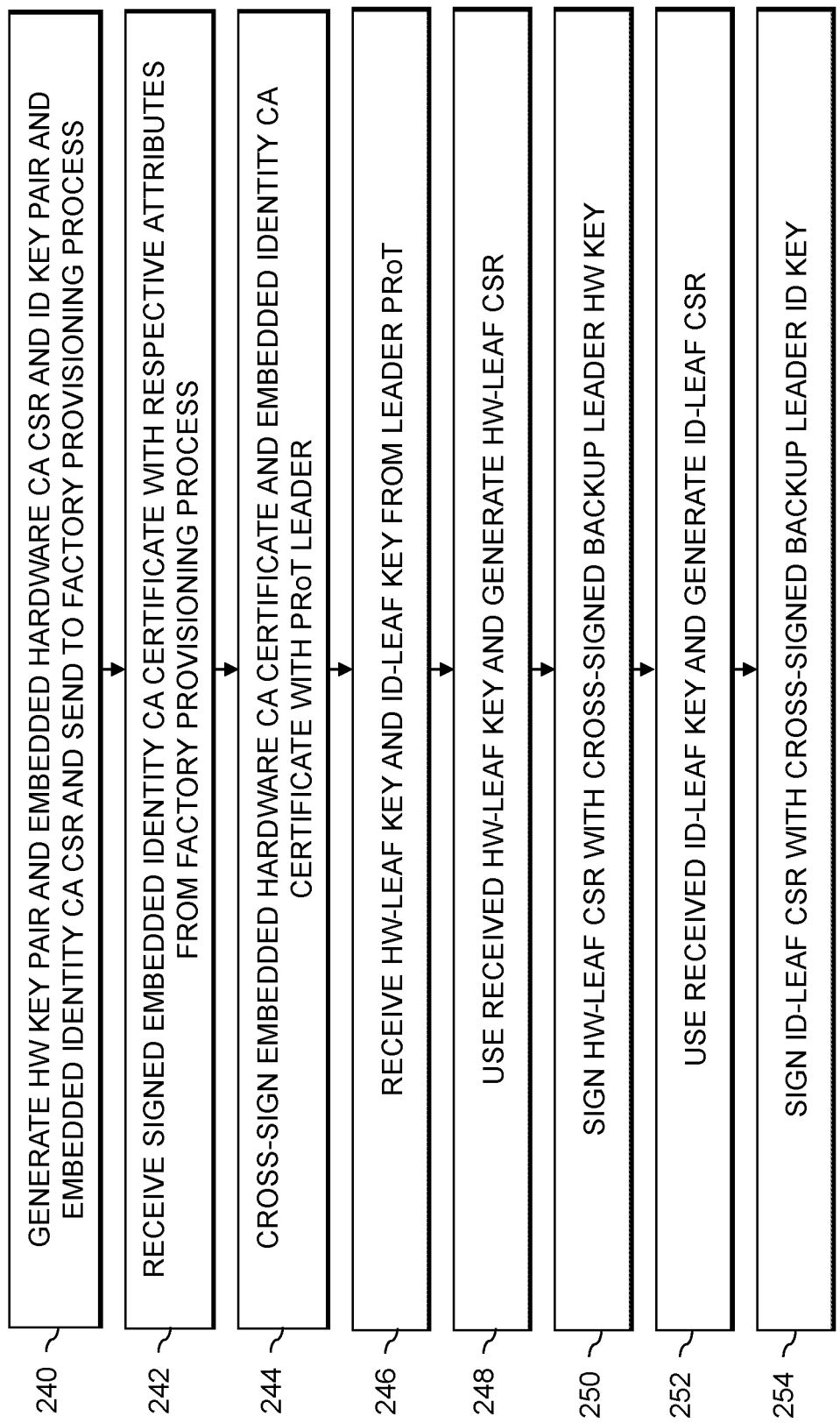

FIGS. 2A, 2B and 2C are flow charts illustrating exemplary implementations of a provisioning process performed by the hardware device provisioning server 105 of FIG. 1, a PRoT leader entity of the hardware device of FIG. 1 and at least one backup PRoT leader entity of the hardware device of FIG. 1, respectively, in accordance with illustrative embodiments.

FIG. 2A illustrates an exemplary provisioning process performed at least in part by the hardware device provisioning module 112 of the hardware device provisioning server 105 of FIG. 1 in accordance with an illustrative embodiment. In the example of FIG. 2A, a PRoT leader of a hardware device being provisioned is elected (e.g., designated) and endorsed and one or more PRoT backup leaders are designated in step 202. In step 204, a leader role is assigned to the PRoT leader and a backup leader role is assigned to the one or more additional PRoTs. One or more responsibilities are assigned to the PRoT leader and the one or more PRoT backup leaders in step 206. Representative responsibilities for PRoT leaders and PRoT backup leaders are discussed further below in conjunction with FIGS. 4A and 4B, for example. The responsibilities may indicate whether the PRoT leaders and the PRoT backup leaders can perform certain tasks, such as verifying the BIOS, measuring the BIOS, verifying and measuring the BMC and/or acting as a trusted key store for a storage controller.

Step 208 initiates a generation of embedded hardware CA certificate signing requests (CSRs) and embedded identity CA CSRs by the PRoT leader and the one or more PRoT BACKUP leaders, as discussed further below in conjunction with FIGS. 2B and 2C, for example.

In step 210, the embedded hardware CA CSR is received from the PRoT leader and the embedded identity CA CSRs are received from the PRoT leader and each PRoT backup leader. In step 212, the assigned roles and responsibilities of the PRoT leader and PRoT backup leader(s) are recorded as attributes of the PRoT leader and each PRoT backup leader in corresponding embedded identity CA certificates. The embedded hardware CA certificate and embedded identity CA certificates are signed in step 214, for example, using a certificate chaining technique, as discussed further below in conjunction with FIG. 6A.

In step 216, the signed embedded hardware CA certificate and the signed embedded identity CA certificate with the leader attributes are provided to the PRoT leader, as discussed further below in conjunction with FIG. 2B and FIG. 6A.

In step 218, the signed embedded identity CA certificate with the respective backup leader attributes is provided to each PRoT backup leader, as discussed further below in conjunction with FIG. 2C and FIG. 6A.

FIG. 2B illustrates an exemplary provisioning process performed at least in part by the role-based provisioning module 130 of a PRoT leader entity of the hardware device 120 of FIG. 1 in accordance with an illustrative embodiment. In the example of FIG. 2B, a hardware (HW) key pair and an embedded hardware CA CSR and an identity (ID) key pair and an embedded identity CA CSR are generated in step 220 and the CSRs are sent to the factory provisioning process of FIG. 2A (e.g., in response to step 208 of FIG. 2A).

Figure 6A:
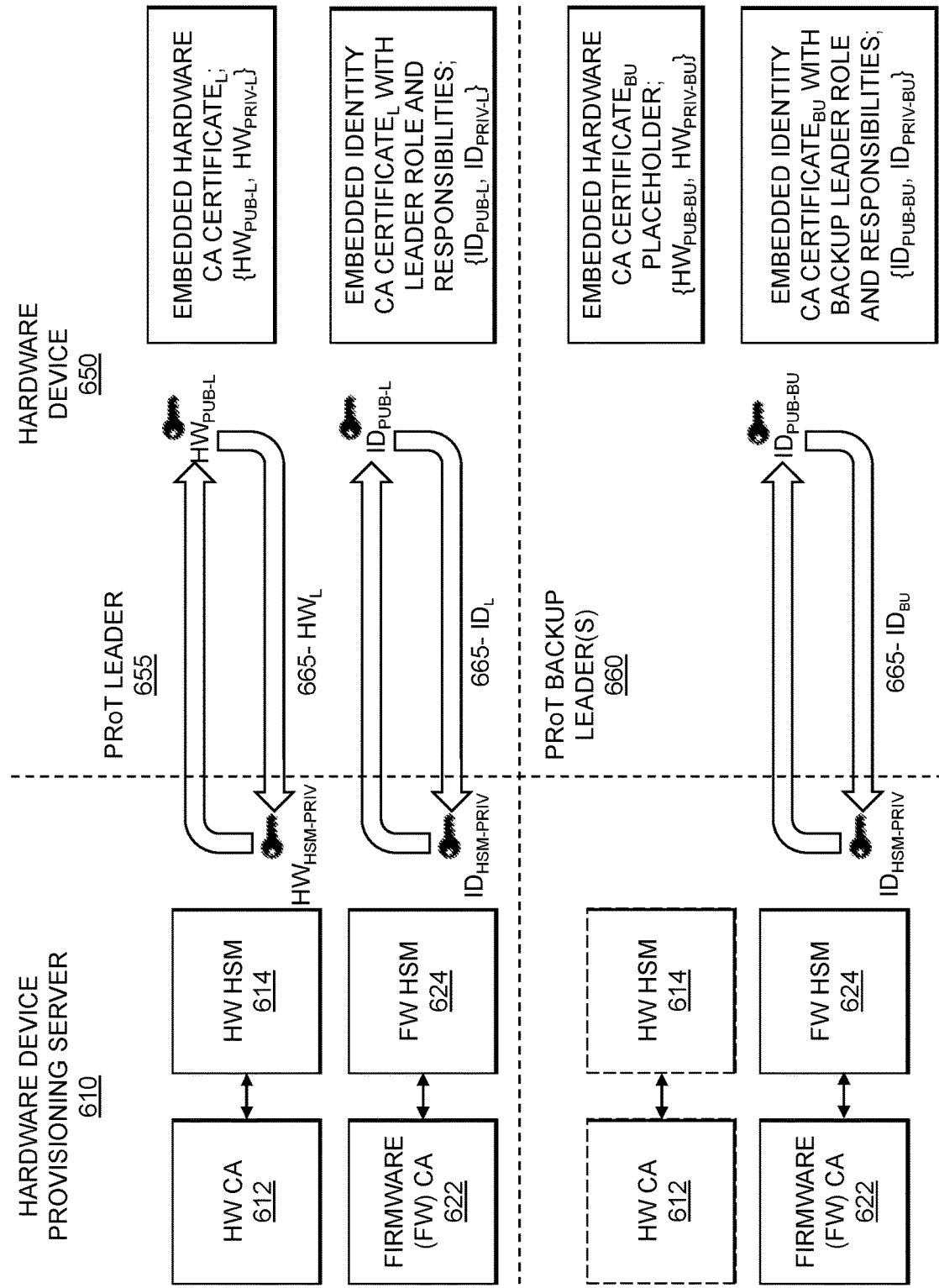
FIGS. 6A through 6C, collectively, illustrate a provisioning of hardware certificates and corresponding hardware keys, and identity certificates and corresponding identity keys to a PRoT leader and one or more PRoT backup leaders in accordance with an illustrative embodiment.

In step 222, the signed embedded hardware CA certificate and the signed embedded identity CA certificate are received from the factory provisioning process of FIG. 2A (e.g., from step 216 of FIG. 2A; see also FIG. 6A).

The embedded hardware CA certificate and the embedded identity CA certificate are separately cross-signed in step

224 with each PRoT backup leader, as discussed further below in conjunction with FIG. 6B.

In step 226, a HW-leaf key and an ID-leaf key are generated and then a HW-LEAF CSR is generated using the HW-leaf key and an ID-LEAF CSR is generated using the ID-leaf key, as discussed further below in conjunction with FIG. 6C.

In step 228, the HW-LEAF CSR is signed with the cross-signed leader HW key and the ID-LEAF CSR is signed with the cross-signed leader ID key, as discussed further below in conjunction with FIG. 6C.

In step 230, the HW-leaf key and the ID-leaf key are provided to the PRoT backup leaders. FIG. 2C illustrates an exemplary provisioning process performed at least in part by the role-based provisioning module 130 of a PRoT backup leader entity of the hardware device 120 of FIG. 1 in accordance with an illustrative embodiment. In the example of FIG. 2C, in step 240, a HW key pair and an embedded hardware CA CSR, and an ID key pair and an embedded identity CA CSR are generated and sent to the factory provisioning process of FIG. 2A (e.g., in response to step 208).

In step 242, a signed embedded identity CA certificate is received with respective backup leader attributes from the factory provisioning process of FIG. 2A (e.g., in response to step 218). In step 244, embedded hardware CA certificate and embedded identity CA certificate are cross-signed with the PRoT leader, as discussed further below in conjunction with FIG. 6B.

The HW-leaf key and the ID-leaf key are received in step 246 from the leader PRoT (e.g., from step 230 of FIG. 2B).

The HW-leaf key is used in step 248 to generate a HW-LEAF CSR, and the HW-LEAF CSR is signed in step 250 with the cross-signed backup leader HW key.

The ID-leaf key is used in step 252 to generate an ID-LEAF CSR, and the ID-LEAF CSR is signed in step 254 with the cross-signed backup leader ID key.

FIG. 3 is a flow chart illustrating an exemplary implementation of a run-time boot process 300 performed by the role-based boot module 135 of a PRoT-candidate device 125 of the hardware device 120 of FIG. 1 in accordance with an illustrative embodiment. In at least some embodiments, a role-based boot module 135 of a given PRoT-candidate device 125 can implement the run-time boot process to determine a PRoT role and PRoT responsibilities of the given PRoT-candidate device 125.

In the example of FIG. 3, each of the PRoT-candidate devices 125 boot up without knowing what their PRoT role and responsibilities and ascertain such information in accordance with the process 300 of FIG. 3.

In step 302, the hardware device is reset. In step 304, the identity key is obtained and the identity certificate is verified to verify the platform identity to a higher-level trust anchor.

In step 306, the PRoT role attribute of the identity certificate is parsed to determine the PRoT role of the current PRoT-candidate device 125 (e.g., as a PRoT leader or a PRoT backup leader).

The PRoT responsibilities attribute of the identity certificate is parsed in step 308 to determine the PRoT responsibilities of the current PRoT-candidate device 125. As noted above, representative responsibilities for PRoT leaders and PRoT backup leaders are discussed further below in conjunction with FIGS. 4A and 4B, for example. The responsibilities may indicate whether the PRoT leaders and the PRoT backup leaders can perform certain tasks, such as verifying the BIOS, measuring the BIOS, verifying and measuring the BMC and/or acting as a trusted key store for a storage controller.

In step 310, the presence of additional PRoTs is discovered. In step 312, the PRoT security actions are implemented for the current PRoT-candidate device 125 based at least in part on the assigned role and responsibilities from steps 306 and 308.

FIGS. 4A and 4B are sample tables identifying device behavior for one or more PRoT backup leaders with full leadership abilities and limited leadership abilities, respectively, in accordance with illustrative embodiments.

In the example of FIG. 4A, a table 400 identifies device behavior for a hardware device having at least one PRoT backup leader with full leadership abilities in accordance with an illustrative embodiment. When both the PRoT leader and the at least one PRoT backup leader are online, the hardware device comprising the PRoT leader and the at least one PRoT backup leader is in a normal, full operational security state. When the PRoT leader is online and the at least one PRoT backup leader has been removed or is unavailable, the hardware device is in a full operational security state with some loss of redundancy. When the PRoT leader has been removed or is unavailable and the at least one PRoT backup leader is online, the hardware device is in a normal, full operational security state. When both the PRoT leader and the at least one PRoT backup leader are both removed or unavailable, the hardware device is non-operational.

In the example of FIG. 4B, a table 450 identifies device behavior for a hardware device having at least one PRoT backup leader with limited leadership abilities in accordance with an illustrative embodiment. When both the PRoT leader and the at least one PRoT backup leader are online, the hardware device comprising the PRoT leader and the at least one PRoT backup leader is in a normal, full operational security state. When the PRoT leader is online and the at least one PRoT backup leader has been removed or is unavailable, the hardware device is in a full operational security state with some loss of redundancy. When the PRoT leader has been removed or is unavailable and the at least one PRoT backup leader is online, the hardware device is in a degraded security state, but functional (e.g., in a safe mode). When both the PRoT leader and the at least one PRoT backup leader are both removed or unavailable, the hardware device is non-operational.

FIGS. 5A and 5B are sample tables identifying roles and corresponding responsibilities for PRoT leaders and for one or more PRoT backup leaders with full leadership abilities and limited leadership abilities, respectively, in accordance with illustrative embodiments.

In the example of FIG. 5A, a table 500 identifies roles and corresponding responsibilities for a PRoT leader and at least one PRoT backup leader with full leadership abilities in accordance with an illustrative embodiment. As shown in FIG. 5A, the PRoT leader is able to: (i) respond to an embedded hardware validator utility; (ii) respond to a remote attestation of device identity; and (iii) provide a verification/attestation of the BIOS. The first PRoT backup leader is able to: (i) respond to an embedded hardware validator utility; (ii) respond to a remote attestation of device identity; and (iii) provide a verification/attestation of the BIOS only when the PRoT leader is unavailable. A second PRoT backup leader, if present, is able to: (i) respond to an embedded hardware validator utility; (ii) respond to a remote attestation of device identity; and (iii) provide a verification/attestation of the BIOS only when the PRoT leader and the first PRoT backup leader are unavailable. An Nth PRoT backup leader, if present, is able to: (i) respond to an embedded hardware validator utility; (ii) respond to a remote attestation of device identity; and (iii) provide a verification/attestation of the BIOS only when the PRoT leader, and PRoT backup leaders 1 through N−1 are unavailable.

In the example of FIG. 5B, a table 550 identifies roles and corresponding responsibilities for a PRoT leader and at least one PRoT backup leader with limited leadership abilities in accordance with an illustrative embodiment. As shown in FIG. 5B, the PRoT leader is able to: (i) respond to an embedded hardware validator utility; (ii) respond to a remote attestation of device identity; and (iii) provide a verification/attestation of the BIOS. The first PRoT backup leader is not able to: (i) respond to an embedded hardware validator utility; or (ii) respond to a remote attestation of device identity; but can (iii) provide a verification/attestation of the BIOS only when the PRoT leader is unavailable. A second PRoT backup leader, if present, is not able to: (i) respond to an embedded hardware validator utility; or (ii) respond to a remote attestation of device identity; but can (iii) provide a verification/attestation of the BIOS only when the PRoT leader and the first PRoT backup leader are unavailable. An Nth PRoT backup leader, if present, is not able to: (i) respond to an embedded hardware validator utility; or (ii) respond to a remote attestation of device identity; but can (iii) provide a verification/attestation of the BIOS only when the PRoT leader, and PRoT backup leaders 1 through N−1 are unavailable.

Figure 6B:
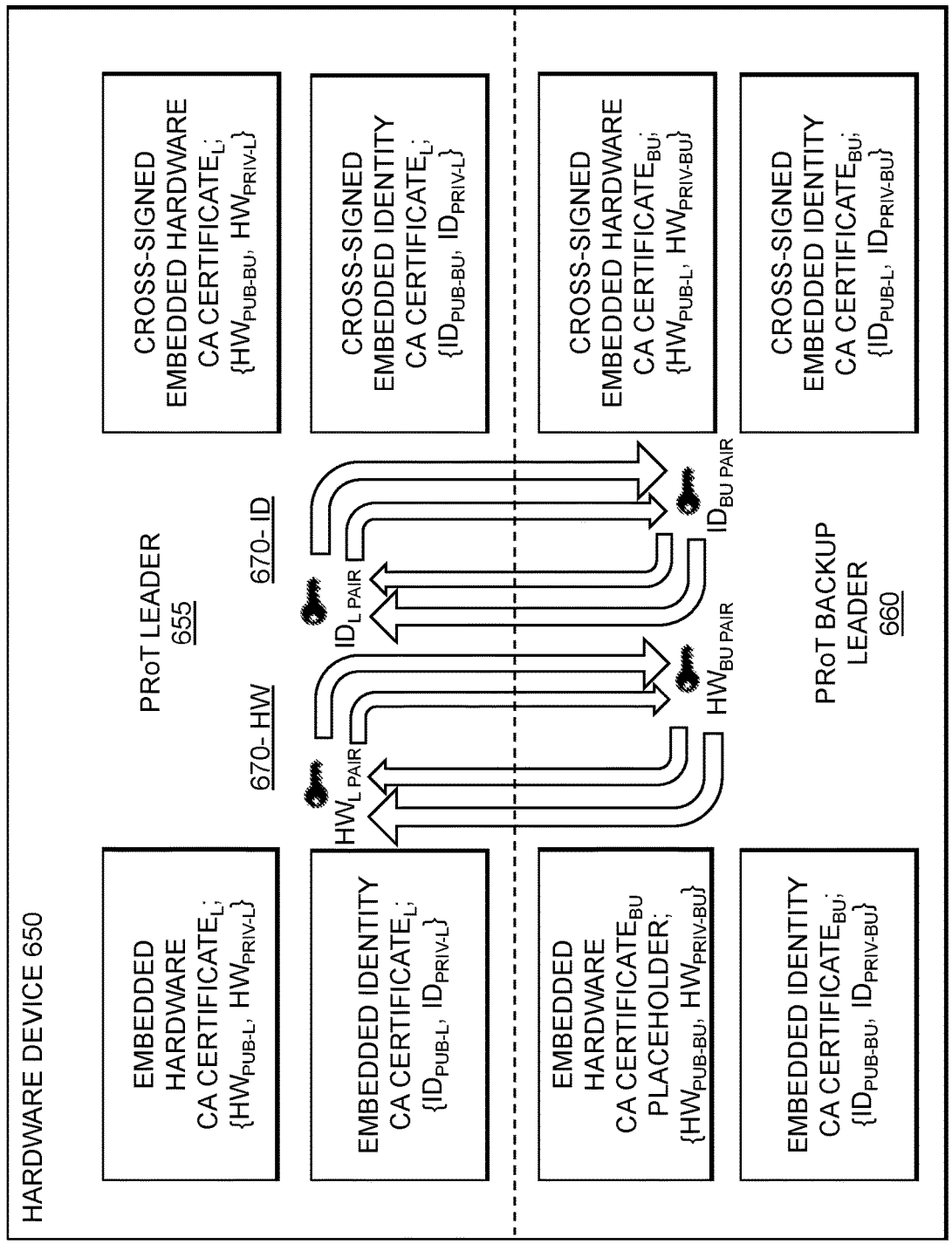
Figure 6C:
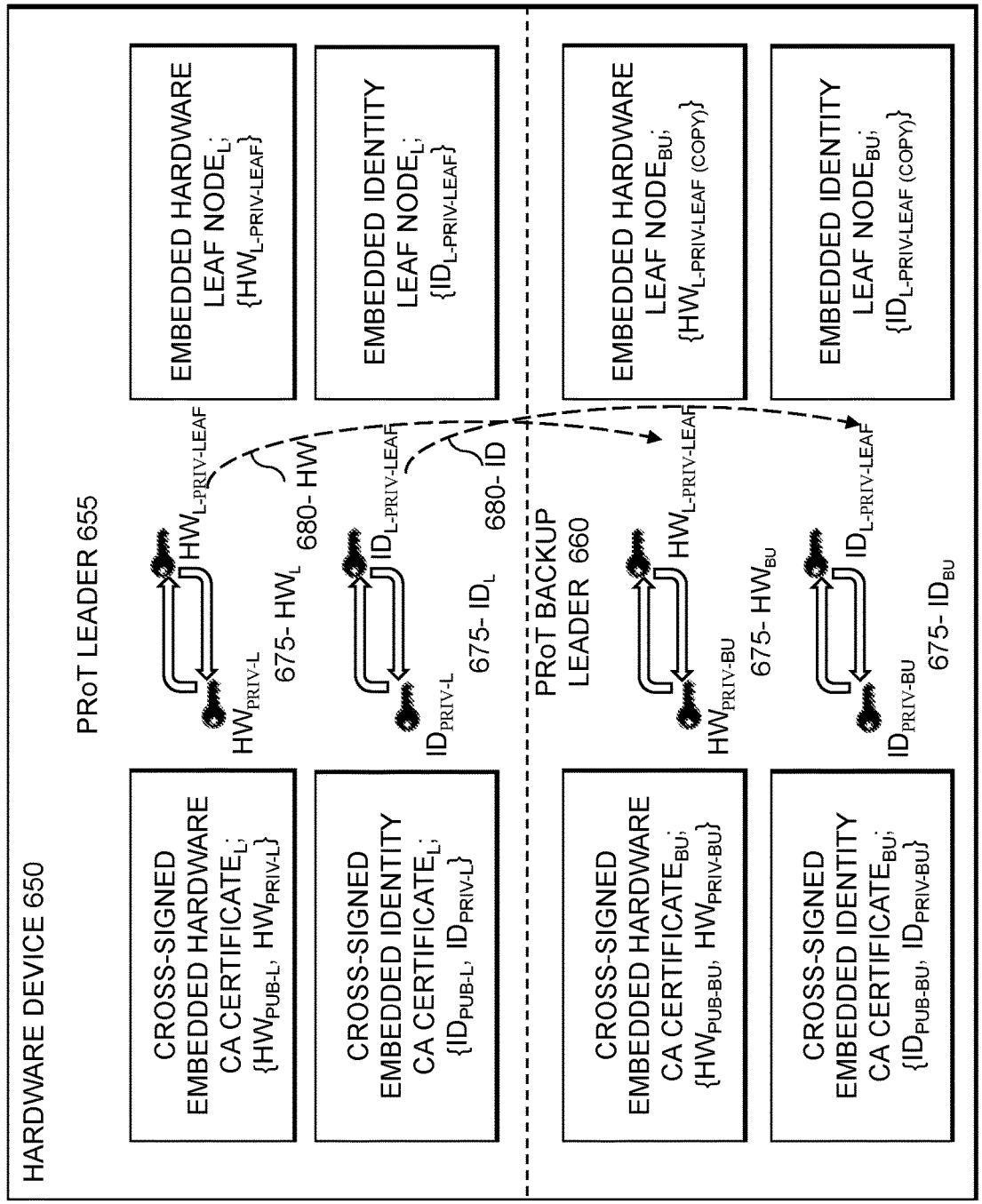

FIGS. 6A through 6C, collectively, illustrate a provisioning of hardware certificates and corresponding hardware keys, and identity certificates and corresponding identity keys to a PRoT leader and one exemplary PRoT backup leader of a hardware device 650 being provisioned in accordance with an illustrative embodiment.

In FIGS. 6A through 6C, an "HSM" subscript is used to indicate a key associated with an HSM module, an "L" subscript is used to indicate a key or certificate associated with a PRoT leader, and a "BU" subscript is used to indicate a key or certificate associated with a PRoT backup leader. A "PRIV" subscript is used to indicate a private key, while a "PUB" subscript is used to indicate a public key. In addition, the hardware device 650 being provisioned in FIGS. 6A through 6C includes only one PRoT backup leader for clarity of illustration, but an extension to multiple PRoT backup leaders would be evident to a person of ordinary skill in the art, based on the present disclosure.

In the example of FIG. 6A, a hardware HSM 614, associated with a hardware device provisioning server 610 and using a factory HW CA 612, and a firmware (FW) (e.g., identity) HSM 624, associated with the hardware device provisioning server 610 and using a factory FW CA 622, provide a source of trust for a hardware device 650 being provisioned. The PRoT leader 655 generates a HW key pair (e.g., randomly) and an embedded hardware CA CSR and an ID key pair and an embedded identity CA CSR and sends the CSRs to the hardware device provisioning server 610.

Likewise, the PRoT backup leader 660 generates a HW key pair and an embedded hardware CA CSR and an ID key pair and an embedded identity CA CSR and sends the CSRs to the hardware device provisioning server 610.

The hardware HSM 614 provides (i) a signed embedded hardware CA certificate embedded (embedded hardware CA certificate$_L$), shown by the certificate chaining of 665-HW$_L$ using the HW$_{HSM-PRIV}$ key of the hardware HSM 614 and the HW$_{PUB-L}$ key of the PRoT leader 655, and a signed embedded identity CA certificate (embedded identity CA certificate$_L$), shown by the certificate chaining of 665-ID$_L$ using the ID HSM-PRIV key of the FW HSM 624 and the ID$_{PUB-L}$ key of the PRoT leader 655, with the assigned leader attributes to the PRoT leader 655, as discussed above in conjunction with step 216 of FIG. 2A; and (ii) a signed embedded identity CA certificate (embedded hardware CA certificate$_{BU}$), shown by the certificate chaining of 665-ID$_{BU}$ using the ID$_{PRIV}$ key of the FW HSM 624 and the ID$_{PUB-BU}$ key of the PRoT backup leader 660, with respective backup leader attributes to each PRoT backup leader 660, as discussed above in conjunction with step 218 of FIG. 2A. Generally, the certificate chaining steps 665 take a private key of a higher-level entity to sign a public key of a lower-level entity in a next level, and the result is encapsulated in a certificate. In this manner, in some embodiments, the hardware HSM 614 endorses the embedded hardware CA certificate key instead of a leaf hardware key; and the FW HSM 624 endorses the embedded identity CA certificate key instead of a leaf identity key.

The PRoT leader 655 stores the generated HW key pair and the ID key pair with the embedded hardware CA certificate$_L$ and the leader embedded identity CA certificate$_L$, respectively. The PRoT backup leader 660 stores the generated HW key pair and the ID key pair with a placeholder for the embedded hardware CA certificate$_{BU}$ and with the leader embedded identity CA certificate$_{BU}$, respectively.

In the example of FIG. 6B, the PRoT leader 655 and the PRoT backup leader 660 create a secure channel, and initiate a cross-signing 670-HW of the respective embedded hardware CA certificates and a cross-signing 670-ID of the embedded identity CA certificates, as discussed hereinafter, using their respective private keys. In at least some embodiments, the cross-signing 670-HW of the respective embedded hardware CA certificates comprises:

1) Using the HW$_{PRIV-L}$ private key to generate an embedded hardware CA CSR and using the HW$_{PRIV-BU}$ private key to sign the embedded hardware CA CSR, to obtain a cross-signed embedded hardware CA certificate$_L$; and
2) Using the HW$_{PRIV-BU}$ private key to generate an embedded hardware CA CSR and using the HW$_{PRIV-L}$ private key to sign the embedded hardware CA CSR, to obtain a cross-signed embedded identity CA certificate$_L$.

Likewise, the cross-signing 670-ID of the respective embedded identity CA certificates comprises:

1) Using the ID$_{PRIV-L}$ private key to generate an embedded identity CA CSR and using the ID$_{PRIV-BU}$ private key to sign the embedded identity CA CSR, to obtain a cross-signed embedded identity CA certificate$_{BU}$; and
2) Using the ID$_{PRIV-BU}$ private key to generate an embedded identity CA CSR and using the ID$_{PRIV-L}$ private key to sign the embedded identity CA CSR, to obtain a cross-signed embedded identity CA certificate$_{BU}$.

In the example of FIG. 6C, hardware and identity leaf nodes are created, where each leaf node comprises has a certificate and a corresponding public key. One or more aspects of the disclosure recognize that regardless of the number of PRoT capable entities in a given hardware device, there should only be one hardware leaf private key and one identity leaf private key for the hardware device, for example, in order to pass a secure component verification (SCV) validation.

Thus, in one or more embodiments, the HW$_{L-PRIV-LEAF}$ private key generated as a result of an embedded hardware CA certificate signing operation 675-HW$_L$ is copied by operation 680-HW to the PRoT backup leader 660. In addition, the $ID_{L\text{-}PRIV\text{-}LEAF}$ private key generated as a result of an embedded identity CA certificate signing operation 675-$ID_L$ is copied by operation 680-ID to the PRoT backup leader 660.

In some embodiments, the copied $HW_{L\text{-}PRIV\text{-}LEAF}$ (COPY) private key of the PRoT backup leader 660 may be used in an embedded hardware CA certificate signing operation 675-$HW_{BU}$, and the copied $ID_L$-PRIV-LEAF (COPY) private key of the PRoT backup leader 660 may be used in an embedded identity CA certificate signing operation 675-$ID_{BU}$.

Figure 7:
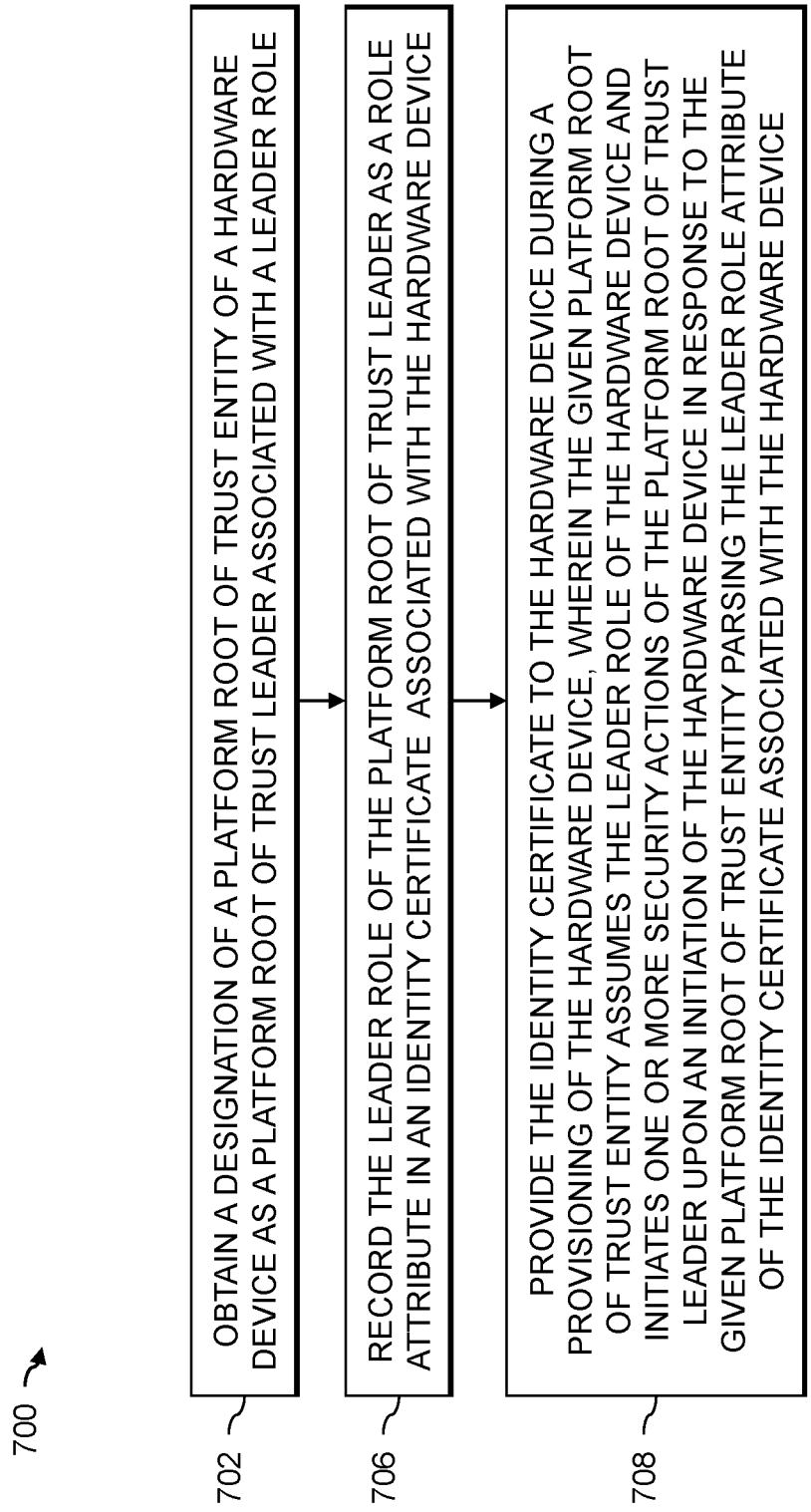
FIG. 7 is a flow chart illustrating an exemplary implementation of a process for provisioning multiple PRoT entities using role-based identity certificates in accordance with an illustrative embodiment.

FIG. 7 is a flow chart illustrating an exemplary implementation of a process 700 for provisioning multiple PRoT entities using role-based identity certificates in accordance with an illustrative embodiment. In the example of FIG. 7, the process 700 initially obtains a designation of a platform root of trust entity of a hardware device in step 702 as a platform root of trust leader associated with a leader role. In step 706, the leader role of the platform root of trust leader may be recorded as a role attribute in an identity certificate associated with the platform root of trust leader.

In step 708, the identity certificate is provided to the hardware device during a provisioning of the hardware device, wherein the given platform root of trust entity assumes the leader role of the hardware device and initiates one or more security actions of the platform root of trust leader upon an initiation of the hardware device in response to the given platform root of trust entity parsing the leader role attribute of the identity certificate associated with the platform root of trust leader.

In some embodiments, one or more leader responsibilities are assigned to the platform root of trust leader and the one or more leader responsibilities of the platform root of trust leader are recorded as a leader responsibility attribute in the identity certificate associated with the platform root of trust leader, and wherein the platform root of trust leader assumes the one or more leader responsibilities upon the initiation of the hardware device in response to the platform root of trust leader parsing the leader responsibility attribute of the identity certificate associated with the platform root of trust leader.

In one or more embodiments, a backup leader role is assigned to the one or more platform root of trust backup leaders and one or more backup leader responsibilities are assigned to the one or more platform root of trust backup leaders and the backup leader role is recorded as a role attribute in an identity certificate associated with the respective backup leader and the one or more backup leader responsibilities of the platform root of trust leader are recorded as a backup responsibility attribute in the identity certificate associated with the respective backup leader, wherein the one or more platform root of trust backup leaders assume the backup leader role and the one or more backup leader responsibilities of the hardware device upon the initiation of the hardware device in response to the one or more platform root of trust backup leaders parsing the backup leader role attribute and the backup leader responsibility attribute of the identity certificate associated with the respective backup leader.

In at least some embodiments, the platform root of trust leader cross-signs the i associated with the platform root of trust leader with the identity certificate associated with each of the one or more platform root of trust backup leaders and the platform root of trust leader signs an identity leaf certificate signing request with a cross-signed leader identity key from the cross-signed identity certificate of the platform root of trust leader. The platform root of trust leader may provide the signed identity leaf key to the one or more platform root of trust backup leaders and wherein each of the one or more platform root of trust backup leaders sign the signed identity leaf certificate signing request with a respective cross-signed backup leader identity key from the cross-signed identity certificate of the respective platform root of trust backup leader.

The particular processing operations and other network functionality described in conjunction with FIGS. 2A through 2C, 3 and 6A through 6C, for example, are presented by way of illustrative example only, and should not be construed as limiting the scope of the disclosure in any way. Alternative embodiments can use other types of processing operations for provisioning multiple PRoT entities using role-based identity certificates. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

The disclosed techniques for provisioning multiple PRoT entities using role-based identity certificates can be employed, for example, to increase PRoT redundancy and the availability of a given hardware device. In addition, the PRoT attributes specified in the identity certificates described herein may be updated using delta certificates in accordance with specifications of the Trusted Computing Group (TCG), for example.

One or more embodiments of the disclosure provide improved methods, apparatus and computer program products for provisioning multiple PRoT entities using role-based identity certificates. The foregoing applications and associated embodiments should be considered as illustrative only, and numerous other embodiments can be configured using the techniques disclosed herein, in a wide variety of different applications.

It should also be understood that the disclosed PRoT provisioning techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for provisioning multiple PRoT entities using role-based identity certificates may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based PRoT provisioning engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based PRoT provisioning platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. These platforms may also be used to implement at least portions of other information processing systems in other embodiments.

Figure 8:
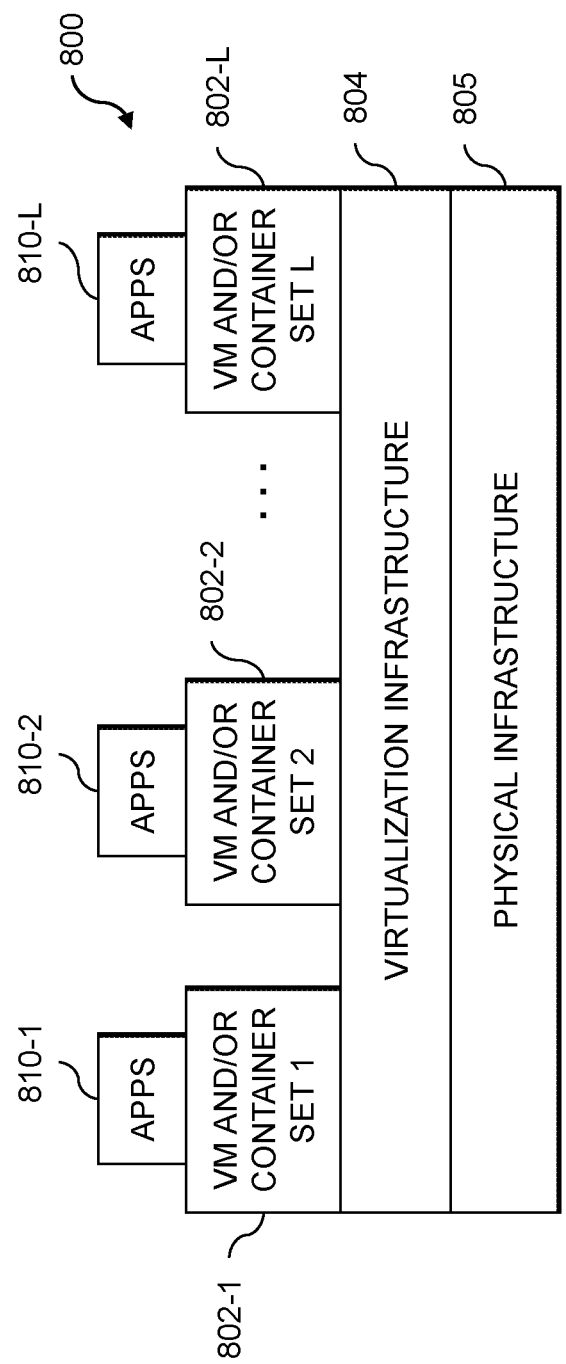
FIG. 8 illustrates an exemplary processing platform that may be used to implement at least a portion of one or more embodiments of the disclosure comprising a cloud infrastructure.

FIG. 8 shows an example processing platform comprising cloud infrastructure 800. The cloud infrastructure 800 comprises a combination of physical and virtual processing resources that may be utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a Linux operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 may comprise respective VMs, respective sets of one or more containers, or respective sets of one or more containers running in VMs.

In some implementations of the FIG. 8 embodiment, the VMs/container sets 802 comprise respective VMs implemented using virtualization infrastructure 804 that comprises at least one hypervisor. Such implementations can provide PRoT provisioning functionality of the type described above for one or more processes running on a given one of the VMs. For example, each of the VMs can implement PRoT provisioning control logic and associated role-based boot functionality for one or more processes running on that particular VM.

An example of a hypervisor platform that may be used to implement a hypervisor within the virtualization infrastructure 804 is the VMware® vSphere® which may have an associated virtual infrastructure management system such as the VMware® vCenter™. The underlying physical machines may comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system. Such implementations can provide PRoT provisioning functionality of the type described above for one or more processes running on different ones of the containers. For example, a container host device supporting multiple containers of one or more container sets can implement one or more instances of PRoT provisioning control logic and associated role-based boot functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises at least a portion of the given system and includes a plurality of processing devices, denoted 902-1, 902-2, 902-3, . . . 902-K, which communicate with one another over a network 904. The network 904 may comprise any type of network, such as a WAN, a LAN, a satellite network, a telephone or cable network, a cellular network, a wireless network such as WiFi or WiMAX, or various portions or combinations of these and other types of networks.

The processing device 902-1 in the processing platform 900 comprises a processor 910 coupled to a memory 912. The processor 910 may comprise a microprocessor, a microcontroller, an ASIC, an FPGA or other type of processing circuitry, as well as portions or combinations of such circuitry elements, and the memory 912, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components, and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and the given system may include additional or alternative processing platforms, as well as numerous distinct processing platforms in any combination, with each such platform comprising one or more computers, storage devices or other processing devices.

Figure 9:
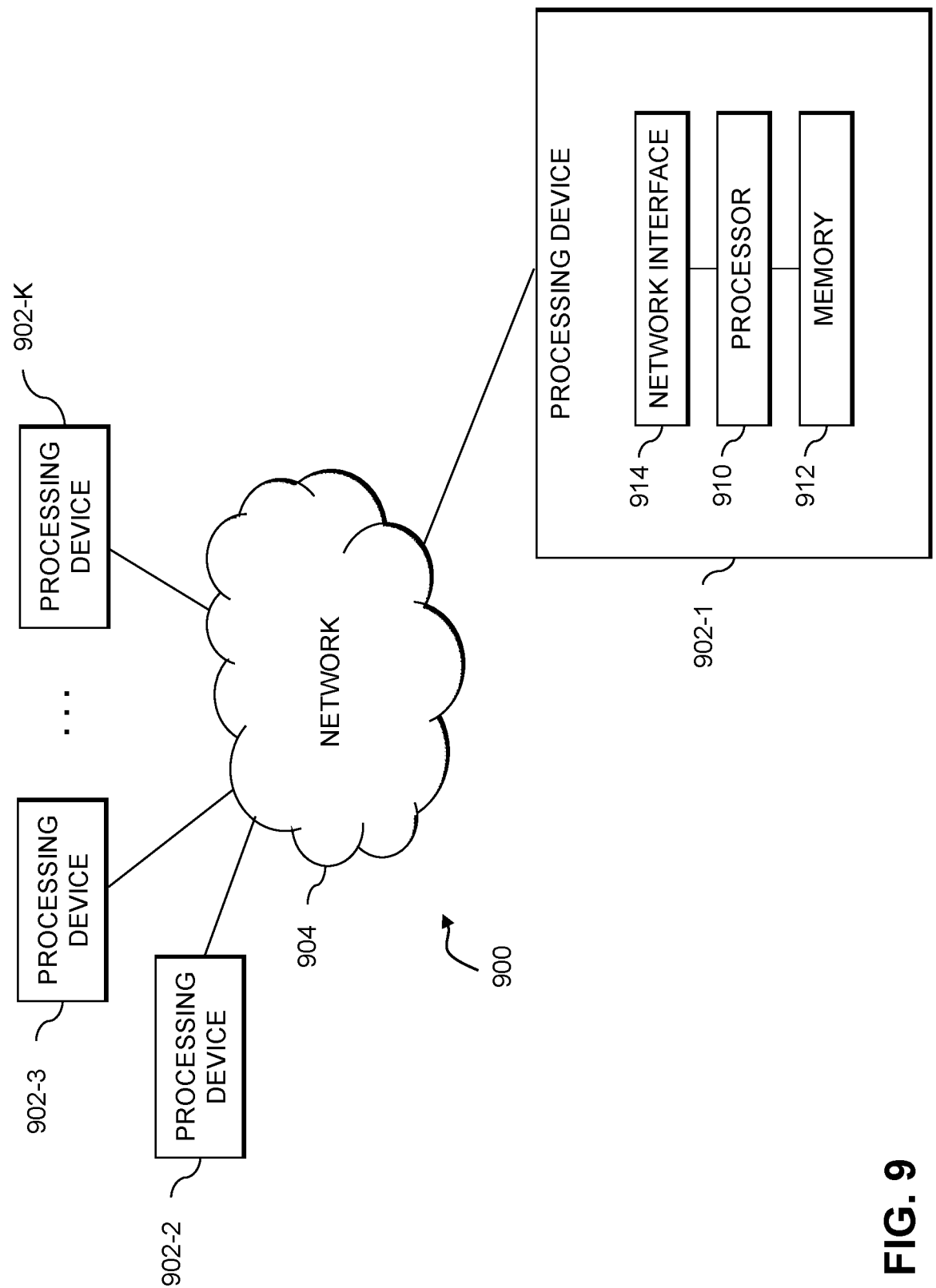
FIG. 9 illustrates another exemplary processing platform that may be used to implement at least a portion of one or more embodiments of the disclosure.

Multiple elements of an information processing system may be collectively implemented on a common processing platform of the type shown in FIG. 8 or 9, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
obtaining a designation of a given platform root of trust entity of a plurality of platform root of trust entities of a hardware device as a platform root of trust leader associated with a leader role;
recording the leader role of the platform root of trust leader as a role attribute in an identity certificate associated with the platform root of trust leader; and
providing the identity certificate to the hardware device during a provisioning of the hardware device, wherein the given platform root of trust entity assumes the leader role of the hardware device and initiates one or more security actions of the platform root of trust leader upon an initiation of the hardware device in response to the given platform root of trust entity parsing the leader role attribute of the identity certificate associated with the platform root of trust leader;
wherein the method is performed by at least one processing device comprising a processor coupled to a memory.

2. The method of claim 1, further comprising assigning one or more leader responsibilities to the platform root of trust leader and recording the one or more leader responsibilities of the platform root of trust leader as a leader responsibility attribute in the identity certificate associated with the platform root of trust leader, and wherein the platform root of trust leader assumes the one or more leader responsibilities upon the initiation of the hardware device in response to the platform root of trust leader parsing the leader responsibility attribute of the identity certificate associated with the platform root of trust leader.

3. The method of claim 1, further comprising obtaining a designation of one or more additional platform root of trust entities as one or more respective platform root of trust backup leaders associated with a backup leader role; assigning one or more backup leader responsibilities to the one or more platform root of trust backup leaders; and recording the backup leader role as a role attribute in an identity certificate associated with the respective backup leader and the one or more backup leader responsibilities of the platform root of trust backup leader as a backup responsibility attribute in the identity certificate associated with the respective backup leader, wherein the one or more platform root of trust backup leaders assume the backup leader role and the one or more backup leader responsibilities of the hardware device upon the initiation of the hardware device in response to the one or more platform root of trust backup leaders parsing the backup leader role attribute and the backup leader responsibility attribute of the identity certificate associated with the respective backup leader.

4. The method of claim 1, wherein the platform root of trust leader cross-signs the identity certificate associated with the platform root of trust leader with the identity certificate associated with each of the one or more platform root of trust backup leaders.

5. The method of claim 4, further comprising the platform root of trust leader signing an identity leaf certificate signing request with a cross-signed leader identity key from the cross-signed identity certificate of the platform root of trust leader.

6. The method of claim 5, further comprising the platform root of trust leader providing the signed identity leaf key to the one or more platform root of trust backup leaders and wherein each of the one or more platform root of trust backup leaders sign the signed identity leaf certificate signing request with a respective cross-signed backup leader identity key from the cross-signed identity certificate of the respective platform root of trust backup leader.

7. The method of claim 1, further comprising providing a hardware certificate to the platform root of trust leader and the one or more platform root of trust backup leaders during a provisioning of the hardware device.

8. The method of claim 7, further comprising the platform root of trust leader cross-signing the hardware certificate of the platform root of trust leader with the hardware certificate of each of the one or more platform root of trust backup leaders and signing a hardware leaf certificate signing request with a cross-signed leader hardware key from the cross-signed hardware certificate of the platform root of trust leader.

9. The method of claim 1, wherein a hardware security module associated with a factory that produces the hardware device endorses the platform root of trust leader as one or more of an embedded hardware certificate authority and an embedded identify certificate authority.

10. An apparatus comprising:
at least one processing device comprising a processor coupled to a memory;
the at least one processing device being configured to implement the following steps:
obtaining a designation of a given platform root of trust entity of a plurality of platform root of trust entities of a hardware device as a platform root of trust leader associated with a leader role;
recording the leader role of the platform root of trust leader as a role attribute in an identity certificate associated with the platform root of trust leader; and
providing the identity certificate to the hardware device during a provisioning of the hardware device, wherein the given platform root of trust entity assumes the leader role of the hardware device and initiates one or more security actions of the platform root of trust leader upon an initiation of the hardware device in response to the given platform root of trust entity parsing the leader role attribute of the identity certificate associated with the platform root of trust leader.

11. The apparatus of claim 10, further comprising assigning one or more leader responsibilities to the platform root of trust leader and recording the one or more leader responsibilities of the platform root of trust leader as a leader responsibility attribute in the identity certificate associated with the platform root of trust leader, and wherein the platform root of trust leader assumes the one or more leader responsibilities upon the initiation of the hardware device in response to the platform root of trust leader parsing the leader responsibility attribute of the identity certificate associated with the platform root of trust leader.

12. The apparatus of claim 10, further comprising obtaining a designation of one or more additional platform root of trust entities as one or more respective platform root of trust backup leaders associated with a backup leader role; assigning one or more backup leader responsibilities to the one or more platform root of trust backup leaders; and recording the backup leader role as a role attribute in an identity certificate associated with the respective backup leader and the one or more backup leader responsibilities of the platform root of trust backup leader as a backup responsibility attribute in the identity certificate associated with the respective backup leader, wherein the one or more platform root of trust backup leaders assume the backup leader role and the one or more backup leader responsibilities of the hardware device upon the initiation of the hardware device in response to the one or more platform root of trust backup leaders parsing the backup leader role attribute and the backup leader responsibility attribute of the identity certificate associated with the respective backup leader.

13. The apparatus of claim 10, further comprising the platform root of trust leader cross-signing a hardware certificate of the platform root of trust leader with a hardware certificate of each of the one or more platform root of trust backup leaders and signing a hardware leaf certificate signing request with a cross-signed leader hardware key from the cross-signed hardware certificate of the platform root of trust leader.

14. The apparatus of claim 10, wherein a hardware security module associated with a factory that produces the hardware device endorses the platform root of trust leader as one or more of an embedded hardware certificate authority and an embedded identify certificate authority.

15. A non-transitory processor-readable storage medium having stored therein program code of one or more software programs, wherein the program code when executed by at least one processing device causes the at least one processing device to perform the following steps:
obtaining a designation of a given platform root of trust entity of a plurality of platform root of trust entities of a hardware device as a platform root of trust leader associated with a leader role;
recording the leader role of the platform root of trust leader as a role attribute in an identity certificate associated with the platform root of trust leader; and
providing the identity certificate to the hardware device during a provisioning of the hardware device, wherein the given platform root of trust entity assumes the leader role of the hardware device and initiates one or more security actions of the platform root of trust leader upon an initiation of the hardware device in response to the given platform root of trust entity parsing the leader role attribute of the identity certificate associated with the platform root of trust leader.

16. The non-transitory processor-readable storage medium of claim 15, further comprising assigning one or more leader responsibilities to the platform root of trust leader and recording the one or more leader responsibilities of the platform root of trust leader as a leader responsibility attribute in the identity certificate associated with the platform root of trust leader, and wherein the platform root of trust leader assumes the one or more leader responsibilities upon the initiation of the hardware device in response to the platform root of trust leader parsing the leader responsibility attribute of the identity certificate associated with the platform root of trust leader.

17. The non-transitory processor-readable storage medium of claim 15, further comprising obtaining a designation of one or more additional platform root of trust entities as one or more respective platform root of trust backup leaders associated with a backup leader role; assigning one or more backup leader responsibilities to the one or more platform root of trust backup leaders; and recording the backup leader role as a role attribute in an identity certificate associated with the respective backup leader and the one or more backup leader responsibilities of the platform root of trust backup leader as a backup responsibility attribute in the identity certificate associated with the respective backup leader, wherein the one or more platform root of trust backup leaders assume the backup leader role and the one or more backup leader responsibilities of the hardware device upon the initiation of the hardware device in response to the one or more platform root of trust backup leaders parsing the backup leader role attribute and the backup leader responsibility attribute of the identity certificate associated with the respective backup leader.

18. The non-transitory processor-readable storage medium of claim 15, further comprising the platform root of trust leader cross-signing a hardware certificate of the platform root of trust leader with a hardware certificate of each of the one or more platform root of trust backup leaders and signing a hardware leaf certificate signing request with a cross-signed leader hardware key from the cross-signed hardware certificate of the platform root of trust leader.

19. The non-transitory processor-readable storage medium of claim 15, wherein a hardware security module associated with a factory that produces the hardware device endorses the platform root of trust leader as one or more of an embedded hardware certificate authority and an embedded identify certificate authority.

20. The non-transitory processor-readable storage medium of claim 15, further comprising providing a hardware certificate to the platform root of trust leader and the one or more platform root of trust backup leaders during a provisioning of the hardware device.

\* \* \* \* \*